US006510926B1

(12) United States Patent
Nakamura

(10) Patent No.: US 6,510,926 B1
(45) Date of Patent: Jan. 28, 2003

(54) DISC BRAKE CALIPER ASSEMBLY

(75) Inventor: Yasushi Nakamura, Hyougo (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/903,860

(22) Filed: Jul. 13, 2001

(51) Int. Cl.[7] .................................................. B62L 5/00
(52) U.S. Cl. ........................................ 188/26; 188/72.6
(58) Field of Search .............................. 188/18 A, 72.4, 188/26

(56) References Cited

U.S. PATENT DOCUMENTS

| | | | | |
|---|---|---|---|---|
| 3,927,736 A | * | 12/1975 | Bergles ........................ | 188/26 |
| 4,031,986 A | * | 6/1977 | Thompson .................. | 188/72.4 |
| 4,370,918 A | * | 2/1983 | Pringle ........................ | 92/163 |
| 6,340,074 B1 | * | 1/2002 | Lumpkin et al. ............. | 186/26 |

FOREIGN PATENT DOCUMENTS

| JP | 2595117 Y2 | 5/1995 |
|---|---|---|
| JP | 08-049736 B2 | 2/1996 |

* cited by examiner

*Primary Examiner*—Matthew C. Graham
(74) *Attorney, Agent, or Firm*—Shinjyu Global IP Counselors, LLP

(57) ABSTRACT

A disc brake includes a caliper housing, a pair of friction members, and a piston. The caliper housing includes a support portion and a cylinder portion coupled to the support portion. The cylinder portion has a piston chamber with a fluid inlet opening. The cylinder portion is an independent component from the support portion. Preferably, the caliper housing includes parts constructed of deformed sheet material such as press formed sheet metal. The parts are preferably fixedly coupled together by welding, brazing and bolts. The friction members are coupled to the caliper housing to form a rotor slot. The piston is mounted in the piston chamber to move one friction member between a release position and a braking position. In one embodiment, an integrated mounting member and a flanged cylinder is provided. In another embodiment, a pair of flanged cylinders with a pair of movable pistons is provided.

38 Claims, 17 Drawing Sheets

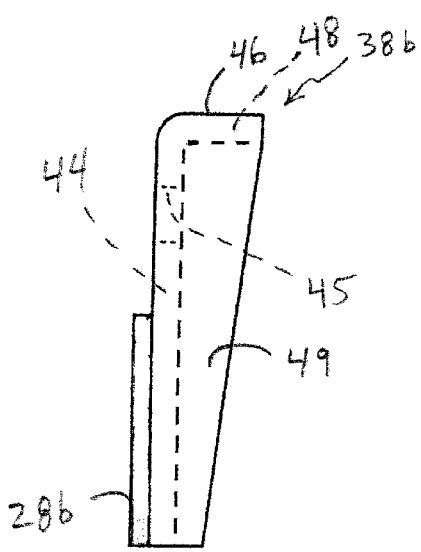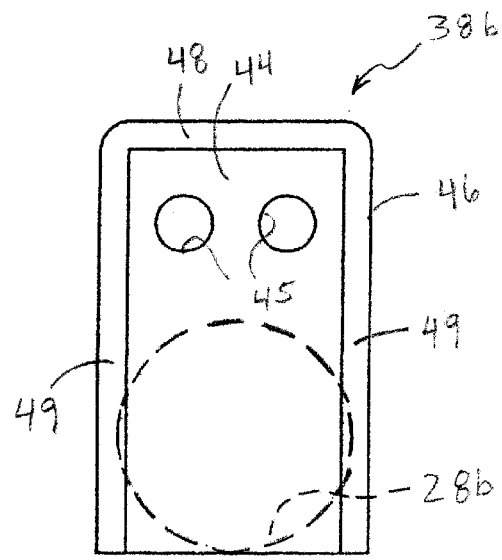
Fig. 12
Fig. 13
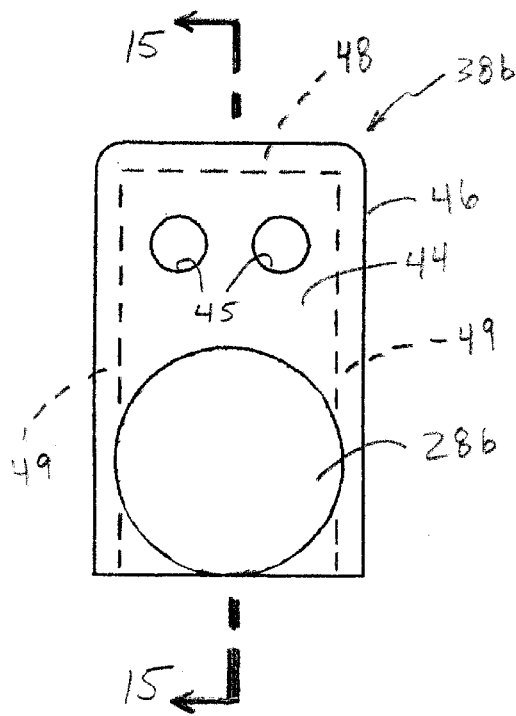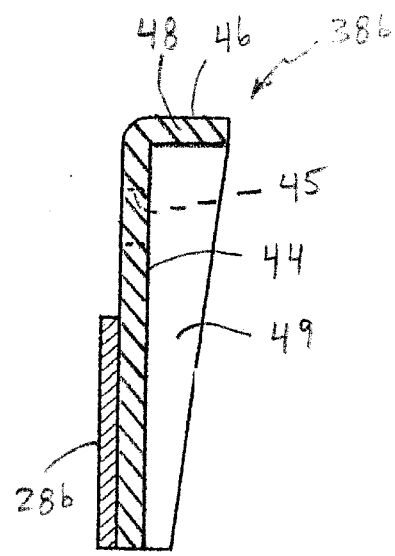
Fig. 14
Fig. 15

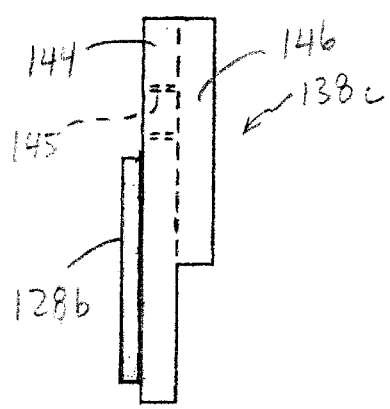
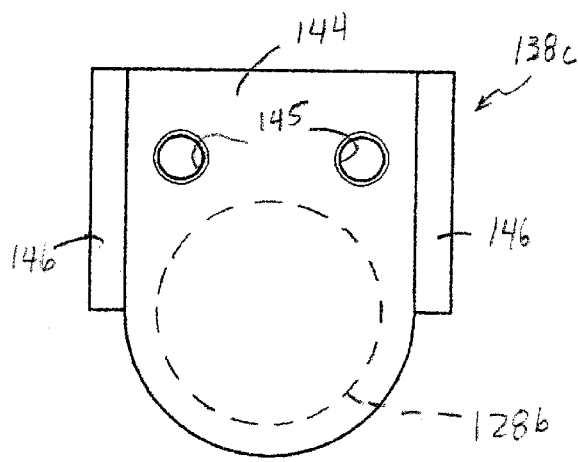
Fig. 38
Fig. 39
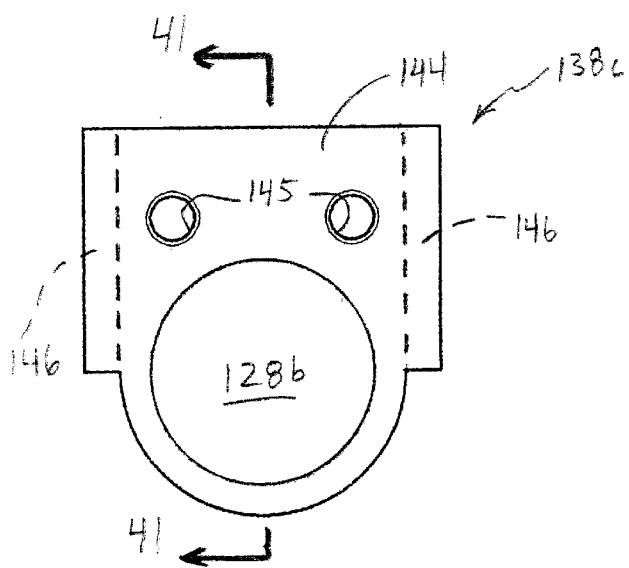
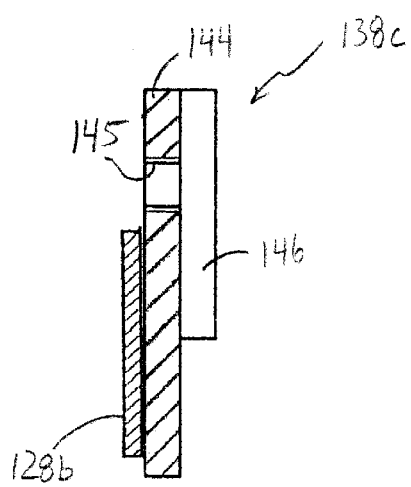
Fig. 40
Fig. 41
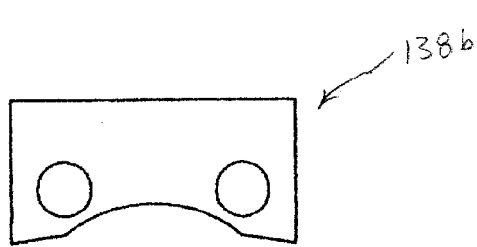
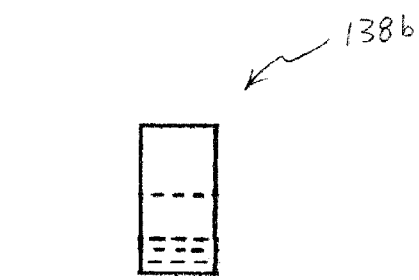
Fig. 42
Fig. 43

DISC BRAKE CALIPER ASSEMBLY

BACKGROUND OF THE INVENTION

1. Field of the Invention

This invention generally relates to a disc brake assembly for a bicycle. More specifically, the present invention relates a disc brake assembly having a caliper housing that is primary constructed of deformed sheet material.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. One particular component of the bicycle, which has been extensively redesigned over the past years, is the braking systems of bicycles.

There are several types of bicycle brake devices, which are currently available on the market. Examples of some types of common bicycle brake devices include rim brakes, caliper brakes and disc brakes. If a rider wants a very high performance brake system, then the rider typically wants a disc brake system. Disc brake systems provide a substantial braking power in relationship to the amount of braking force applied to the brake lever. Moreover, disc brake systems typically provide a high level of consistency in all types of weather and riding conditions. However, one problem with disc brakes is that they can be complicated and expensive to manufacture and assemble.

Specifically, these prior art disc brakes are typically constructed of several parts with each part constructed of die cast metallic material. Alternatively, these parts can be machined, or both die cast and subsequently machined. These processes can be time consuming and expensive. The parts are usually connected via numerous bolts and utilize sealing members to prevent leakage of the hydraulic or actuating fluid. Thus, these prior disc brakes are somewhat complicated. Some prior disc brakes utilize dual pistons and/or opposing single pistons to move the friction member(s) to engage the brake rotor and apply a stopping force. Thus, these prior art disc brakes can require internal fluid passageways and can be somewhat intricate internally. Moreover, these prior disc brakes can be quite heavy.

In view of the above, there exists a need for a disc brake for a bicycle which overcomes the above mentioned problems in the prior art. This invention addresses this need in the prior art as well as other needs, which will become apparent to those skilled in the art from this disclosure.

SUMMARY OF THE INVENTION

One object of the present invention is to provide a disc brake, which is relatively simple and inexpensive to manufacture and assemble.

Another object of the present invention is to provide disc brake, which is relatively lightweight.

Another object of the present invention is to provide disc brake, which provides efficient and reliable stopping power.

The foregoing objects can basically be achieved by providing a disc brake caliper assembly comprising a caliper housing, first and second friction members, and a first piston. The caliper housing includes a support portion and a first cylinder portion coupled to the support portion. The first cylinder portion has a first piston chamber with a first fluid inlet opening fluidly coupled to the first piston chamber and a first piston receiving opening. The first cylinder portion is an independent component from the support portion. The first and second friction members are coupled to the caliper housing to form a rotor receiving slot therebetween. At least the first friction member is movably coupled to the caliper housing. The first piston is movably coupled in the first piston chamber of the caliper housing to move the first friction member between a release position and a braking position.

The foregoing objects can also basically be achieved by providing a a disc brake caliper assembly comprising a caliper housing, first and second friction members, and a first piston. The caliper housing includes a support portion and a first cylinder portion coupled to the support portion. The first cylinder portion is formed of deformed sheet material. The first cylinder portion has a first piston chamber with a first fluid inlet opening fluidly coupled to the first piston chamber and a first piston receiving opening. The first and second friction members are coupled to the caliper housing to form a rotor receiving slot therebetween. At least the first friction member is movably coupled to the caliper housing. The first piston is movably coupled in the first piston chamber of the caliper housing to move the first friction member between a release position and a braking position.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 12 is an end elevational view of a second housing part of the disc brake caliper assembly illustrated in FIGS. 1–3, 5 and 6;

FIG. 13 is an inside elevational view of the second housing part illustrated in FIG. 12;

FIG. 14 is an outside elevational view of the second housing part illustrated in FIGS. 12 and 13;

FIG. 15 is a cross-sectional view of the second housing part illustrated in FIGS. 12–14, as viewed along section line 15—15 of FIG. 14;

FIG. 38 is an end elevational view of a second housing part of the disc brake caliper assembly illustrated in FIGS. 31 and 32;

FIG. 39 is an inside elevational view of the second housing part illustrated in FIG. 38;

FIG. 40 is an outside elevational view of the second housing part illustrated in FIGS. 38 and 39;

FIG. 41 is a cross-sectional view of the second housing part illustrated in FIGS. 38–40, as viewed along section line 41—41 of FIG. 40;

FIG. 42 is a side elevational view of a spacer of the disc brake caliper assembly illustrated in FIGS. 31 and 32;

FIG. 43 is an end elevational view of the spacer illustrated in FIG. 42;

DETAILED DESCRIPTION OF THE PREFERRED EMBODIMENTS

Figure 1:
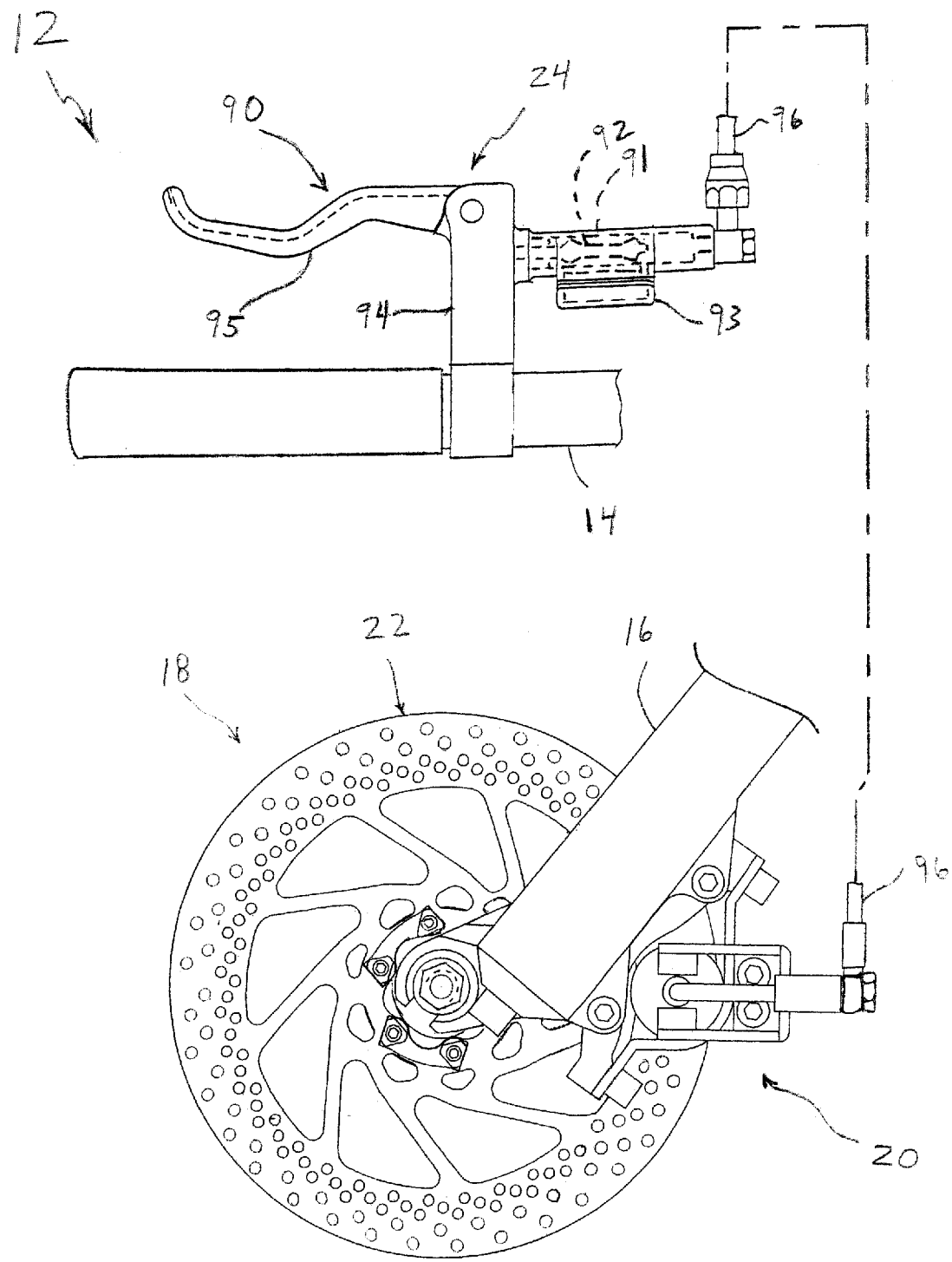
FIG. 1 is a diagrammatic elevational view of a bicycle disc brake with a disc brake caliper assembly in accordance with a first embodiment of the present invention.
Figure 2:
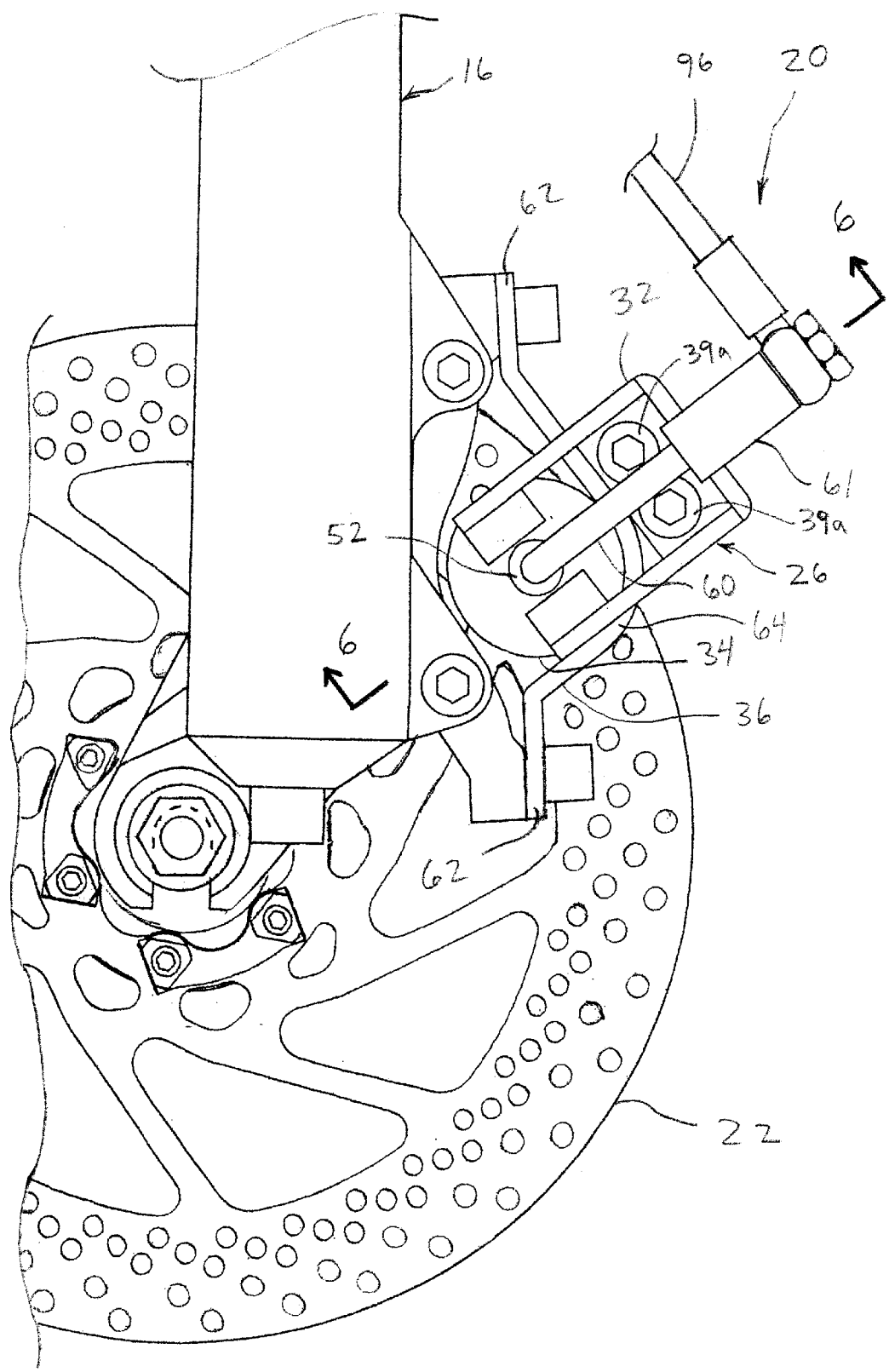
FIG. 2 is an enlarged outside elevational view of the disc brake caliper assembly illustrated in FIG. 1, with portions of the disc brake rotor cut away.
Figure 3:
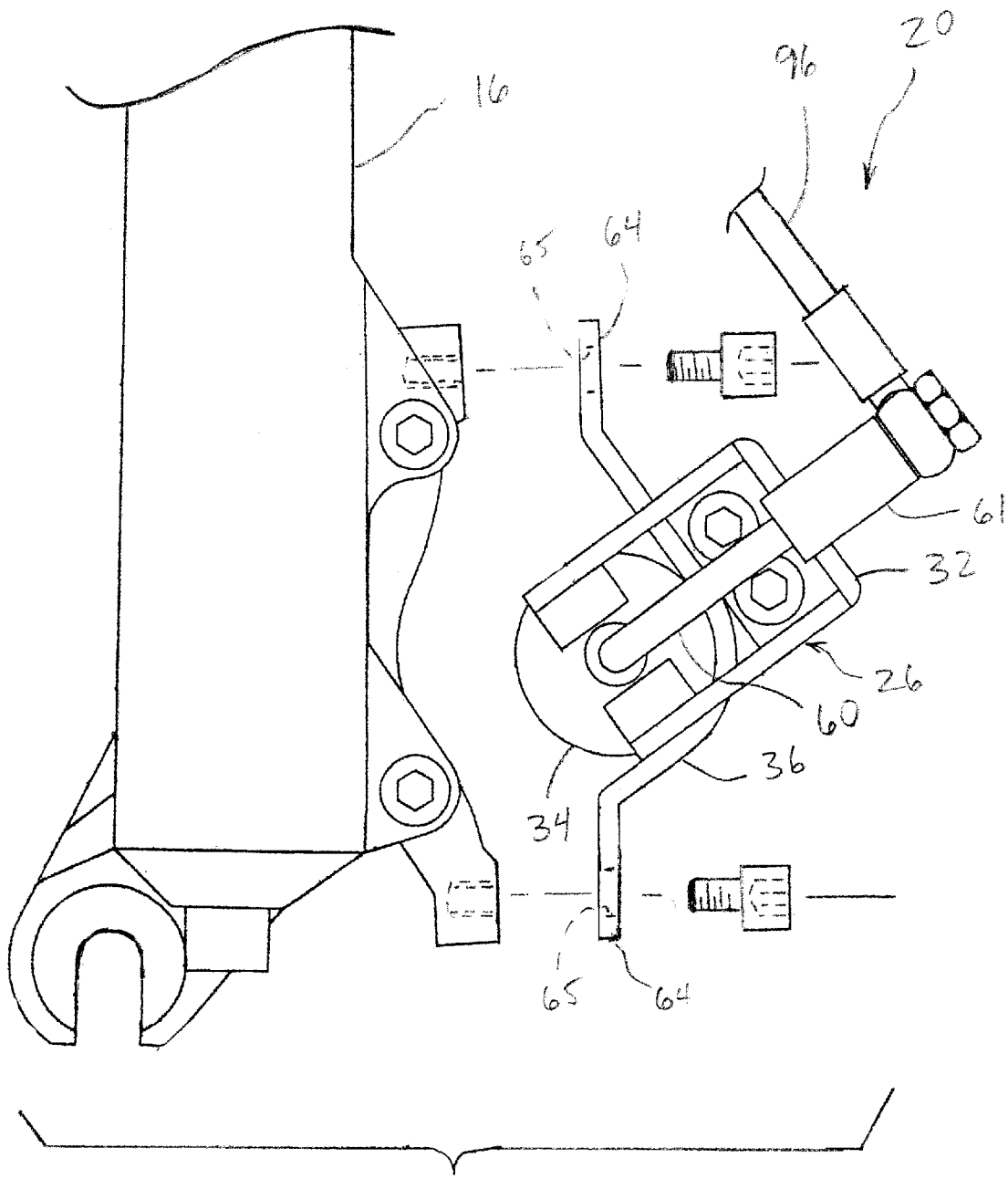
FIG. 3 is a partially exploded view of the disc brake caliper assembly illustrated in FIG. 2, with the front fork removed from the front wheel for the purpose of illustration.
Figure 4:
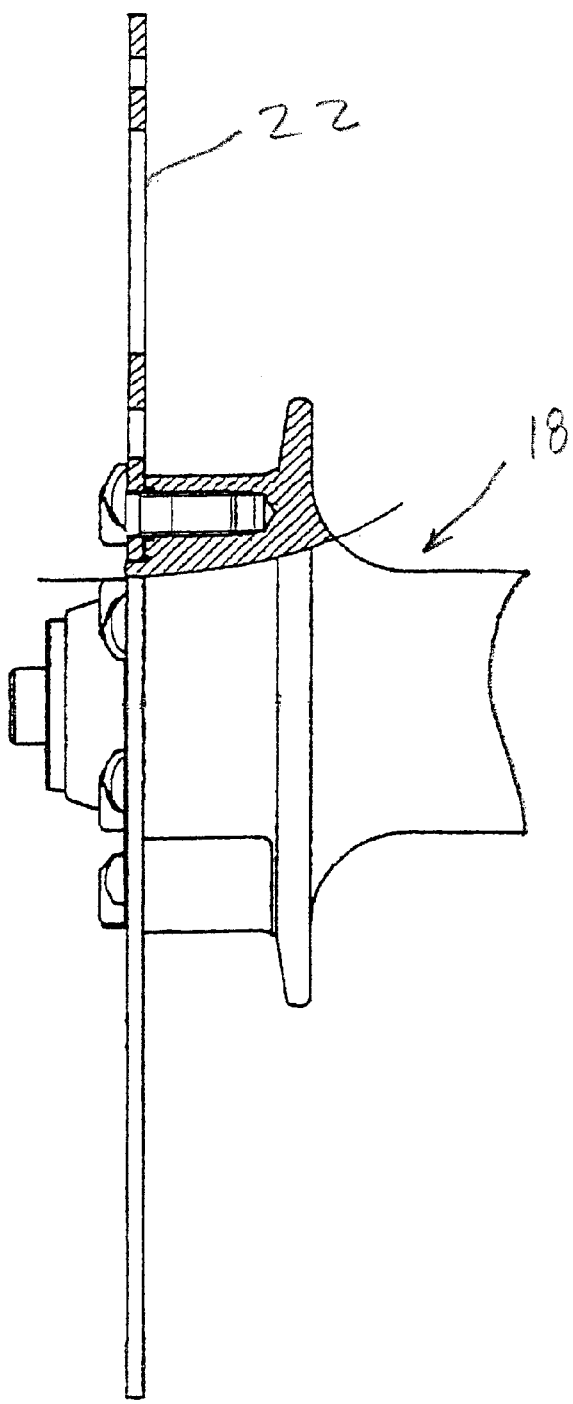
FIG. 4 is an end elevational view of the front hub of the front bicycle wheel illustrated in FIGS. 1 and 2, with portions broken away to show the attachment between the disc brake rotor and the hub body.

Referring initially to FIG. 1, a front portion of a bicycle is illustrated with a disc brake assembly 12 coupled thereto in accordance with one embodiment of the present invention. Bicycles are well known in the art, and thus, the bicycle and its various components will not be discussed or illustrated in detail herein. Rather, it will be apparent to those skilled in the art that the bicycle can be any type of bicycle, e.g., mountain bike, a hybrid bike, downhill bike or a road bike. The bicycle basically includes a conventional bicycle frame with a handle bar 14, front and rear forks 16 (only a portion of the front fork shown), front and rear wheels 18 (only a portion of the front wheel shown) and a drive train (not shown).

Only the front portion of the bicycle (front fork 16) is illustrated as having the disc brake assembly 12. However, it will be apparent to those skilled in the art from this disclosure that a second disc brake assembly 12 can be utilized for stopping the rear wheel of the bicycle. Moreover, it will also be apparent to those skilled in the art from this disclosure that various changes and modifications can be made from the embodiments disclosed herein without departing from the scope of the invention as defined in the appended claims.

Referring to FIGS. 2–6, the disc brake assembly 12 basically includes a disc brake caliper assembly 20, a disc brake rotor 22 and a brake operating mechanism 24. The disc brake caliper assembly 20 is mounted on front fork 16 of the bicycle adjacent the disc brake rotor 22. The disc brake rotor 22 is fixedly coupled to front wheel 18 for rotation therewith in a conventional manner. The brake operating mechanism 24 is preferably fixedly mounted on handle bar 14 adjacent the hand portion of handle bar 14. The brake operating mechanism 24 is operated such that at least one friction member of the disc brake caliper assembly 20 moves from a release position to a braking position. In the release position, the bicycle wheel 18 and the disc brake rotor 22 are free to rotate, while in the braking position a braking force is applied against the disc brake rotor 22 to stop rotation of the bicycle wheel 18 and the disc brake rotor 22.

Figure 5:
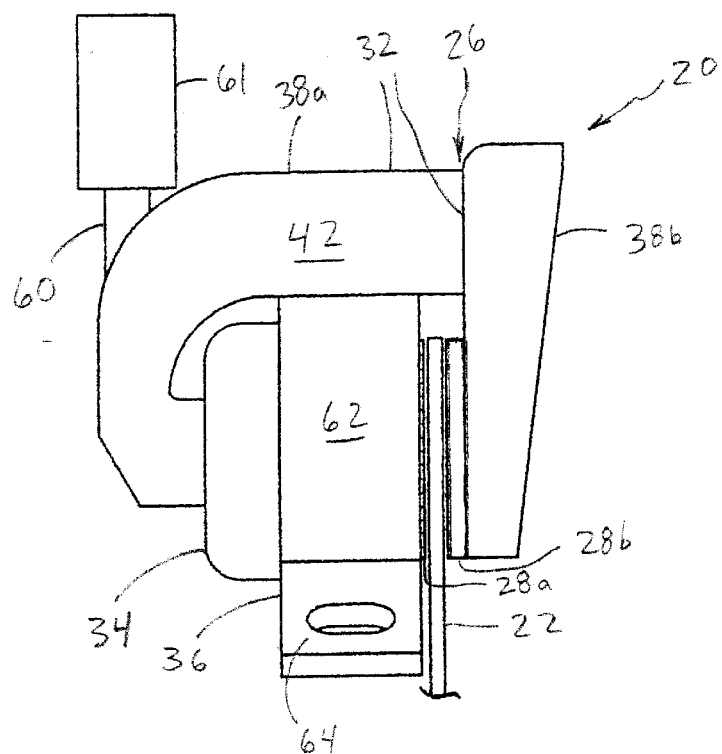
FIG. 5 is an end elevational view of the disc brake caliper assembly illustrated in FIGS. 1–3, with the disc brake caliper assembly removed. from the front fork.
Figure 6:
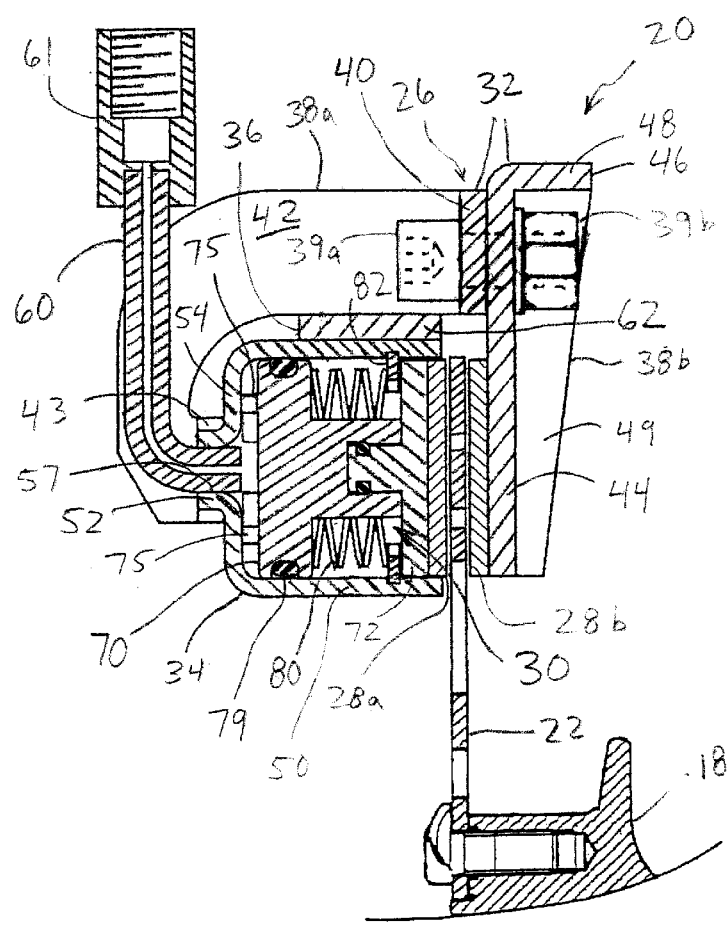
FIG. 6 is a partial, cross-sectional view of the disc brake caliper assembly illustrated in FIGS. 1–3 and 5, as viewed along section line 6—6 of FIG. 2.
Figure 7:
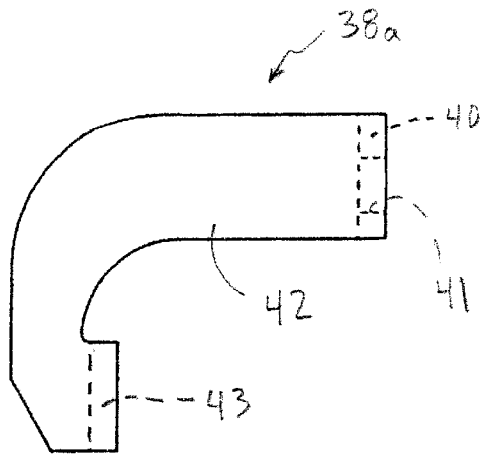
FIG. 7 is an end elevational view of a first housing part of the disc brake caliper assembly illustrated in FIGS. 1–3, 5 and 6.
Figure 8:
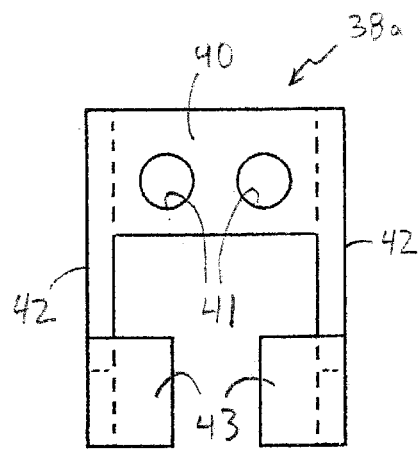
FIG. 8 is an inside elevational view of the first housing part illustrated in FIG. 7.
Figure 9:
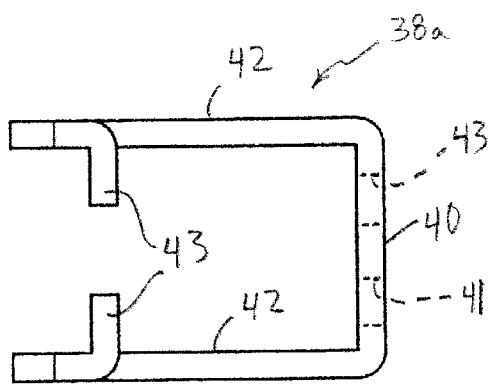
FIG. 9 is a bottom view of the first housing part illustrated in FIGS. 7 and 8.
Figure 10:
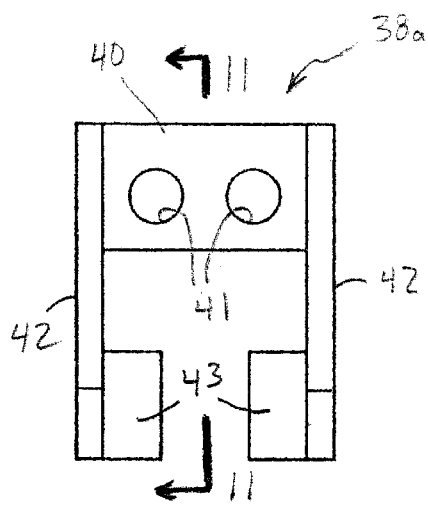
FIG. 10 is an outside elevational view of the first housing part illustrated in FIGS. 7–9.
Figure 11:
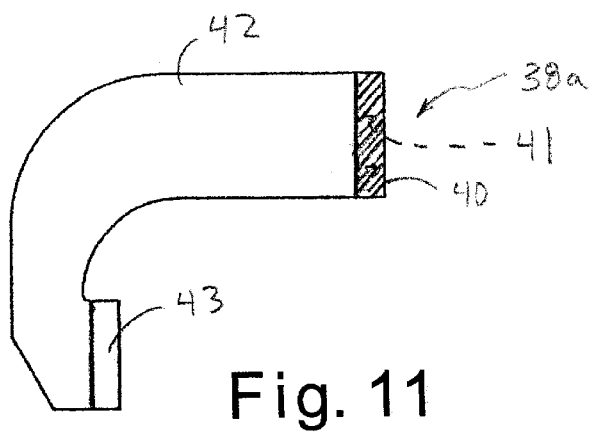
FIG. 11 is a cross-sectional view of the first housing part illustrated in FIGS. 7–10, as viewed along section line 11—11 in FIG. 10.
Figure 16:
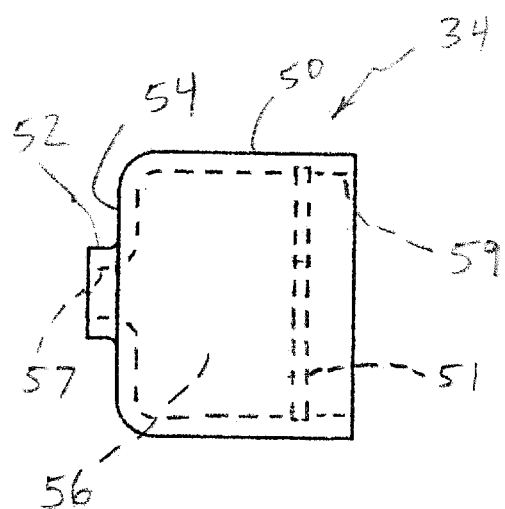
FIG. 16 is an end elevational view of a cylinder portion of the disc brake caliper assembly illustrated in FIGS. 1–3, 5 and 6.
Figure 17:
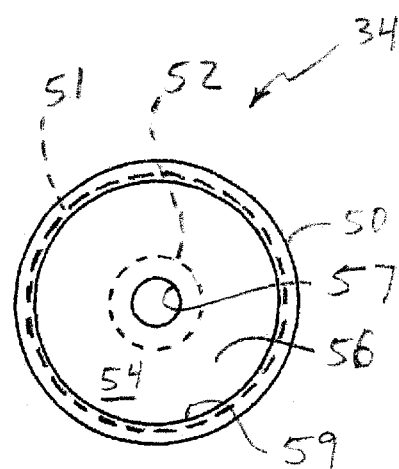
FIG. 17 is an inside elevational view of the cylinder portion illustrated in FIG. 16.
Figure 18:
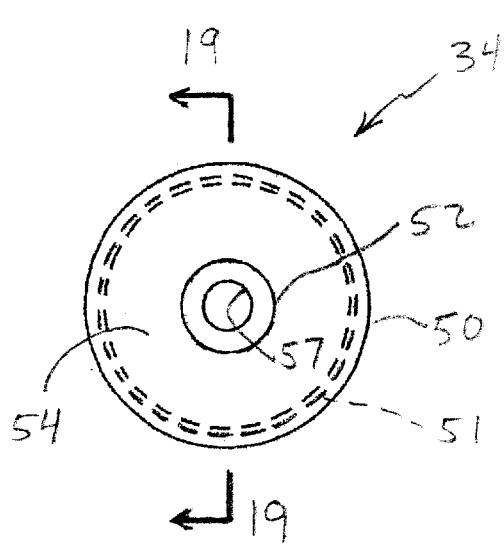
FIG. 18 is an outside elevational view of the cylinder portion illustrated in FIGS. 16 and 17.
Figure 19:
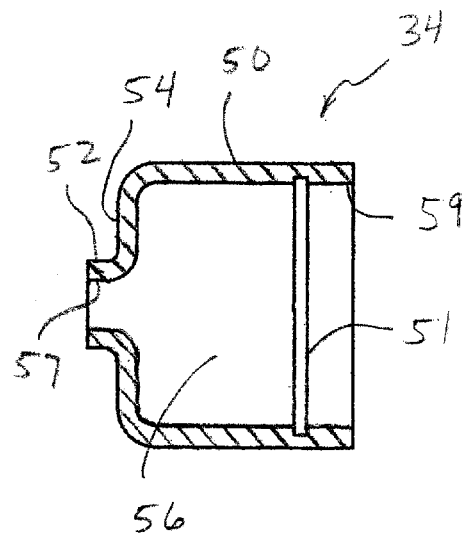
FIG. 19 is a cross-sectional view of the cylinder portion illustrated in FIGS. 16–18, as viewed along section line 19—19 of FIG. 18.
Figure 20:
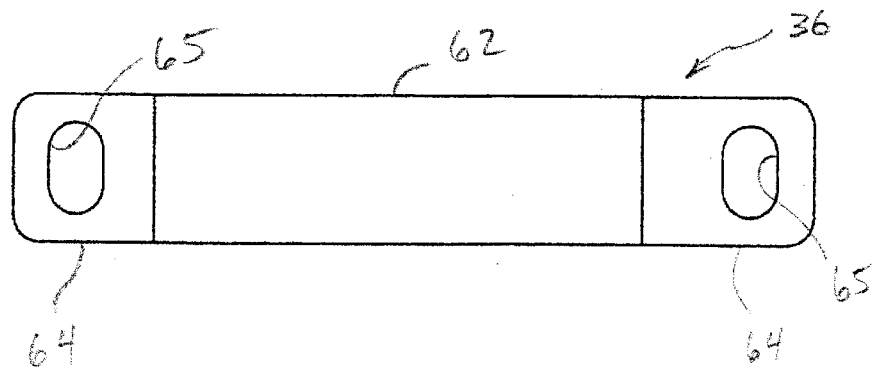
FIG. 20 is an end elevational view of a mounting member of the disc brake caliper assembly illustrated in FIGS. 1–3, 5 and 6.
Figure 21:
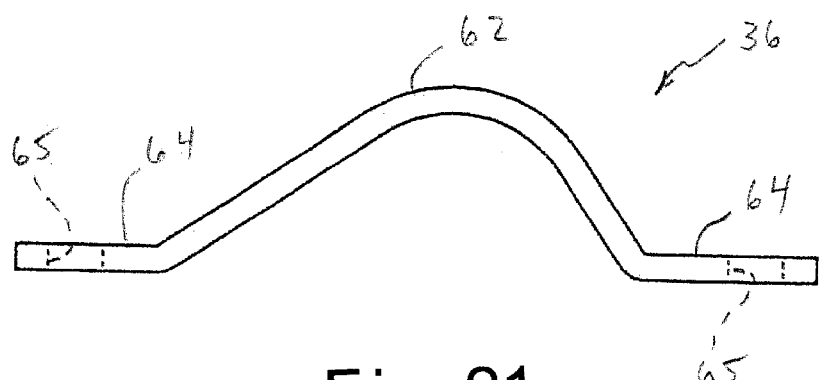
FIG. 21 is an inside elevational view of the mounting member illustrated in FIG. 20.
Figure 22:
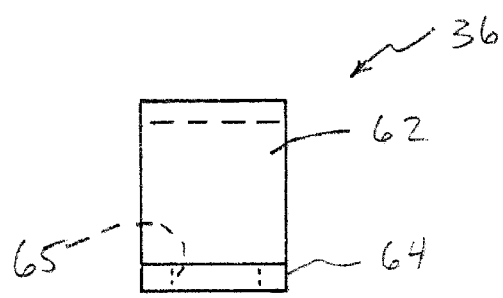
FIG. 22 is a transverse end elevational view of the mounting member illustrated in FIGS. 21 and 22.
Figure 23:
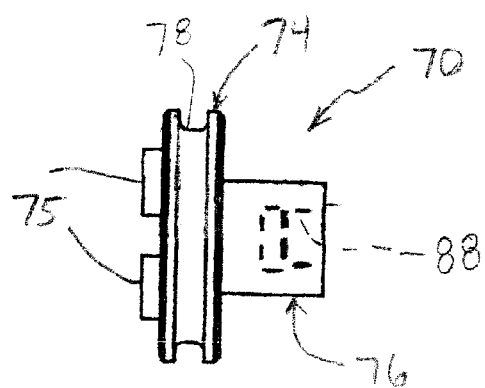
FIG. 23 is an end elevational view of a piston of the disc brake caliper assembly illustrated in FIGS. 1–3, 5 and 6.
Figure 24:
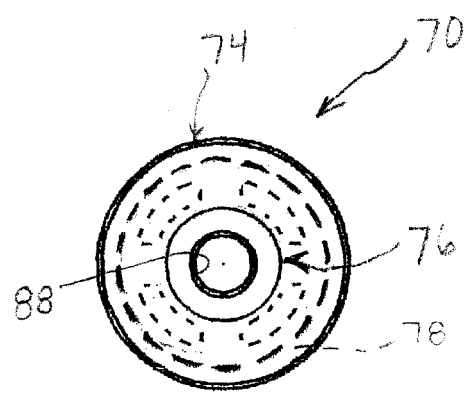
FIG. 24 is an inside elevational view of the piston illustrated in FIG. 23;.
Figure 25:
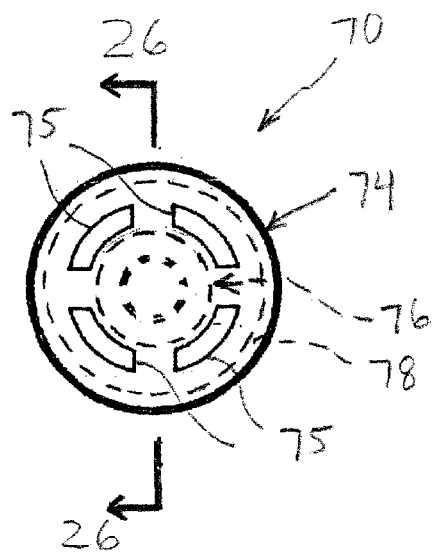
FIG. 25 is an outside elevational view of the piston illustrated in FIGS. 23 and 24.
Figure 26:
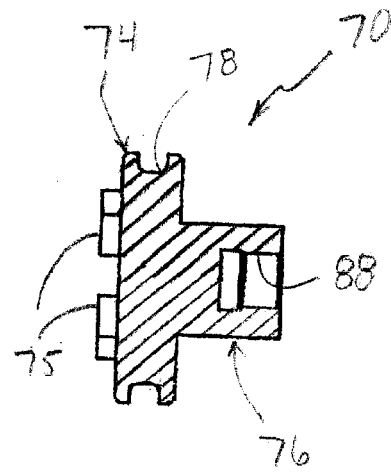
FIG. 26 is a cross-sectional view of the piston illustrated in FIGS. 23–25, as viewed along section line 26—26 of FIG. 25.
Figure 27:
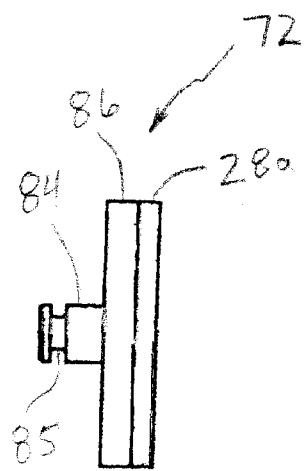
FIG. 27 is an end elevational view of a first friction member of the disc brake caliper assembly illustrated in FIGS. 1–3, 5 and 6.
Figure 28:
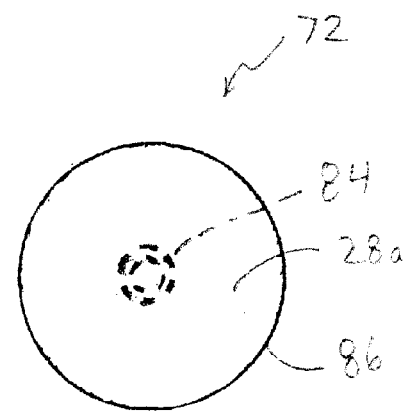
FIG. 28 is an inside elevational view of the first friction member illustrated in FIG. 27.
Figure 29:
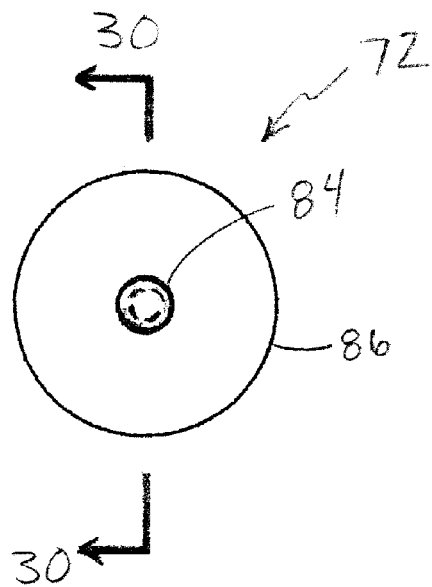
FIG. 29 is an outside elevational view of the first friction member illustrated in FIGS. 27 and 28.
Figure 30:
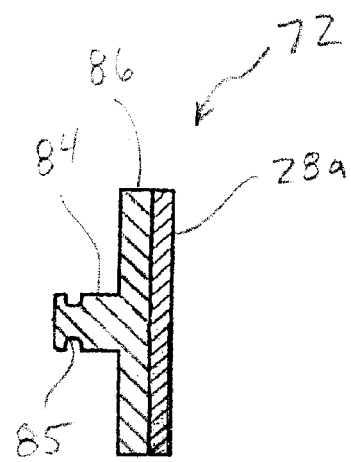
FIG. 30 is a cross-sectional view of the first friction member illustrated in FIGS. 27–29, as viewed along section line 30—30 of FIG. 29.
Figure 31:
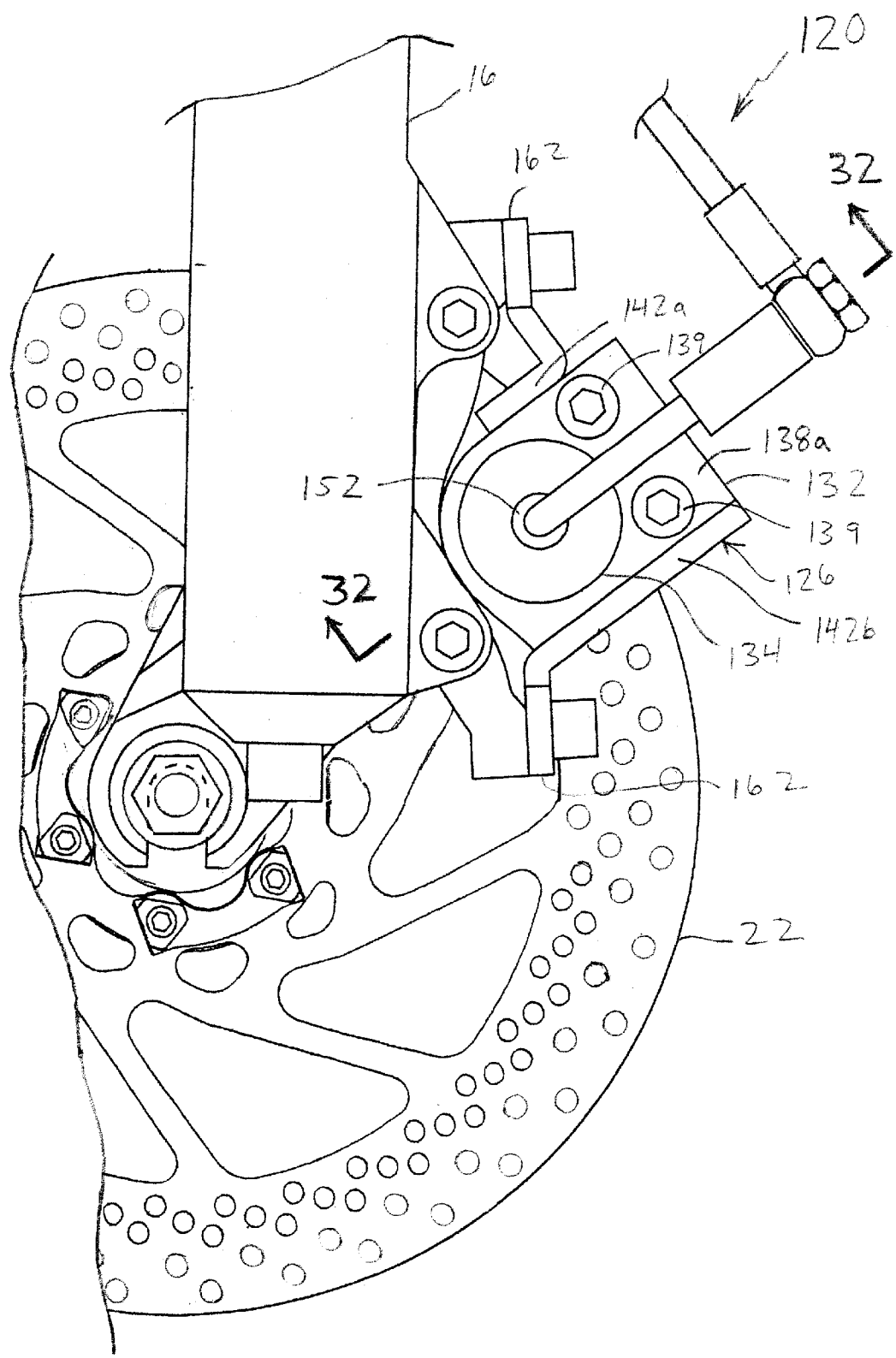
FIG. 31 is an enlarged outside elevational view of a disc brake caliper assembly in accordance with a second embodiment of the present invention.
Figure 32:
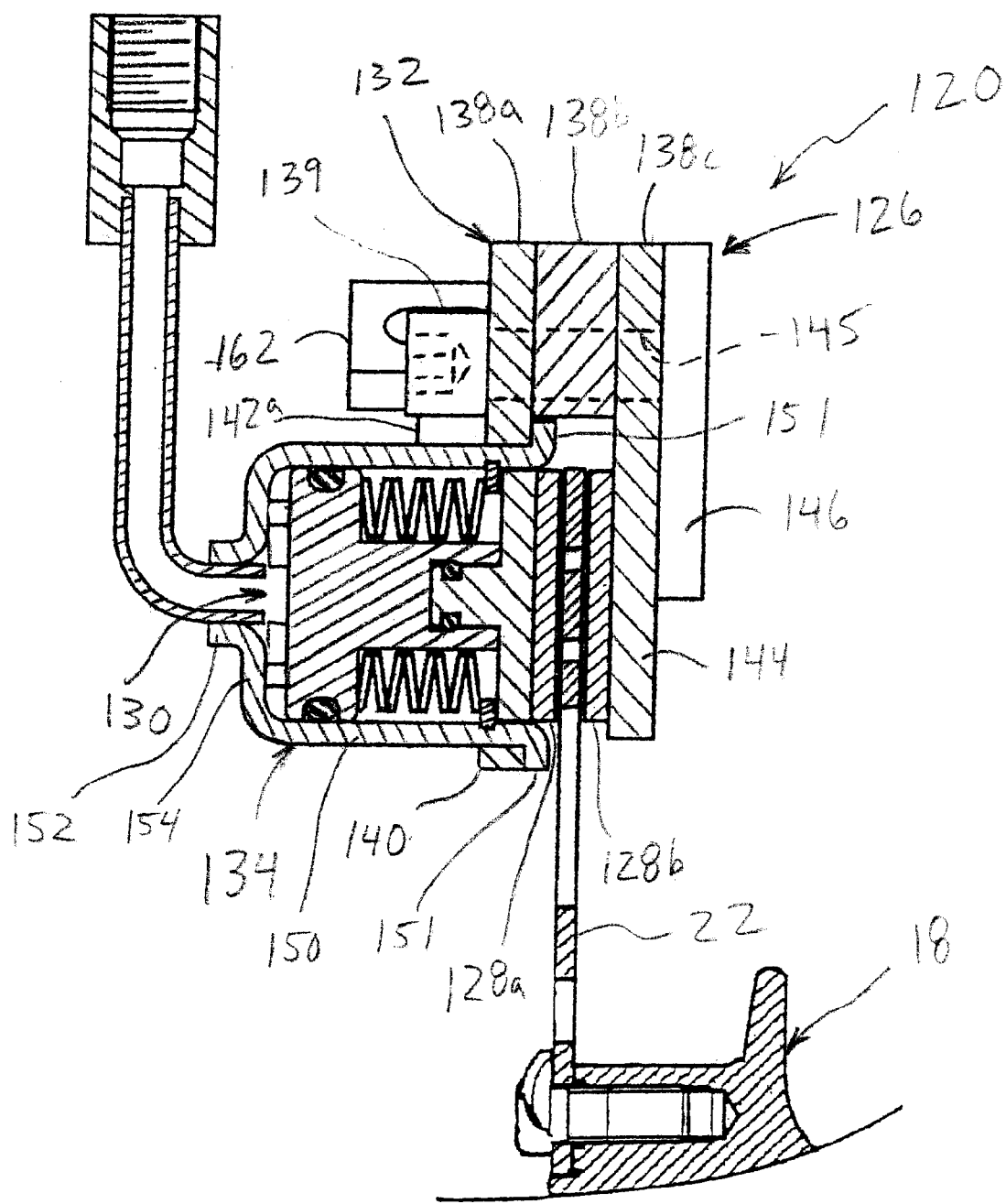
FIG. 32 is a partial cross-sectional view of the disc brake caliper assembly illustrated in FIG. 31, as viewed along section line 32—32 of FIG. 31.
Figure 33:
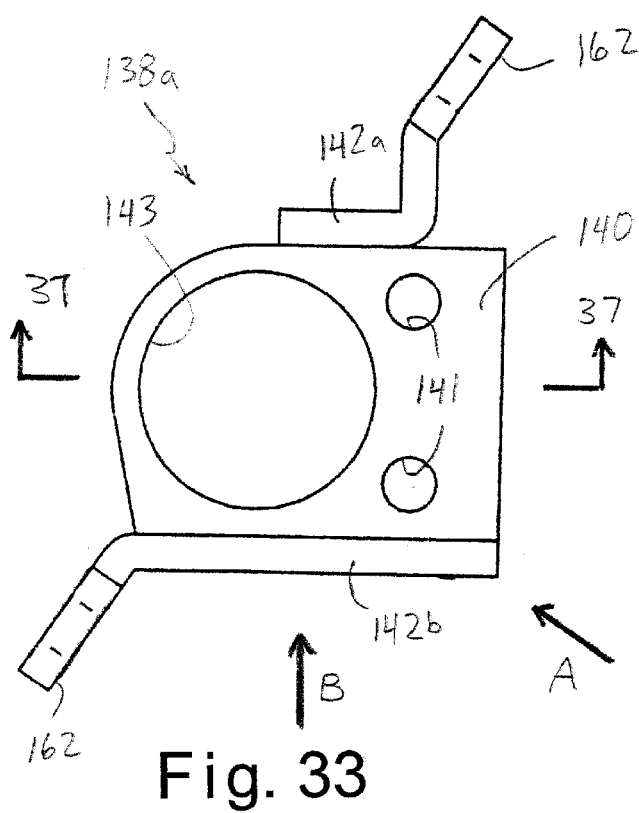
FIG. 33 is an outside elevational view of a first housing part of the disc brake caliper assembly illustrated in FIGS. 31 and 32.
Figure 34:
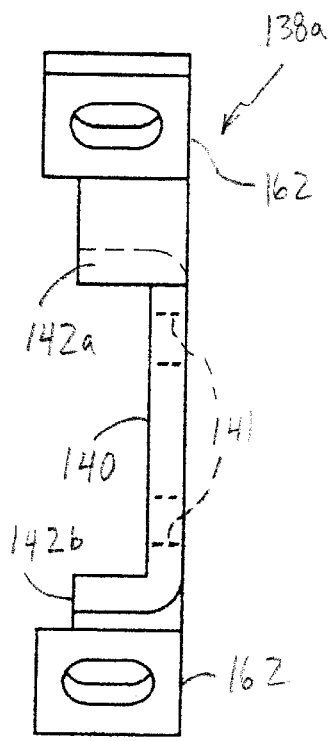
FIG. 34 is an end elevational view of the first housing part illustrated in FIG. 33.
Figure 35:
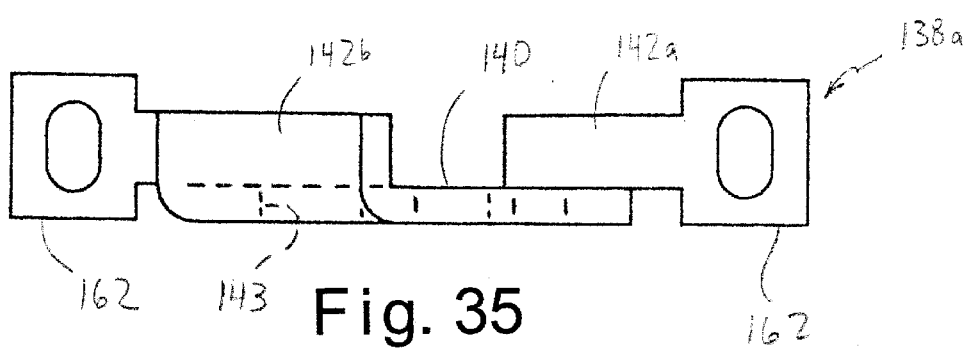
FIG. 35 is an end elevational view of the first housing part illustrated in FIGS. 33 and 34, as viewed along arrow A in FIG. 33.
Figure 36:
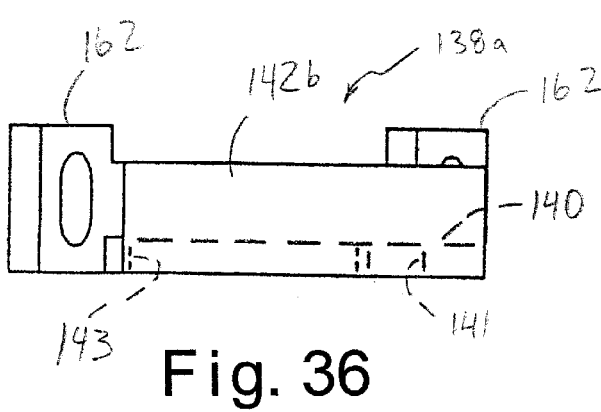
FIG. 36 is an end elevational view of the first housing part illustrated in FIGS. 33–35 as viewed along arrow B in FIG. 33.
Figure 37:
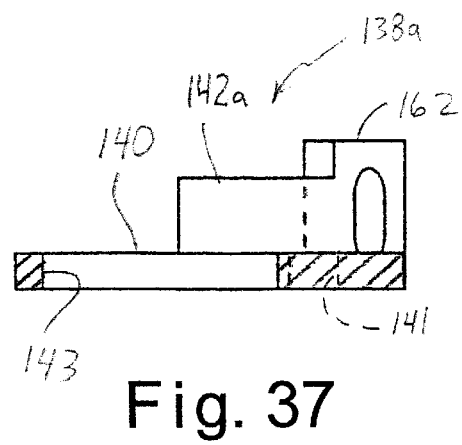
FIG. 37 is a cross-sectional view of the first housing part illustrated in FIGS. 33–36, as viewed along section line 37—37 in FIG. 33.
Figure 44:
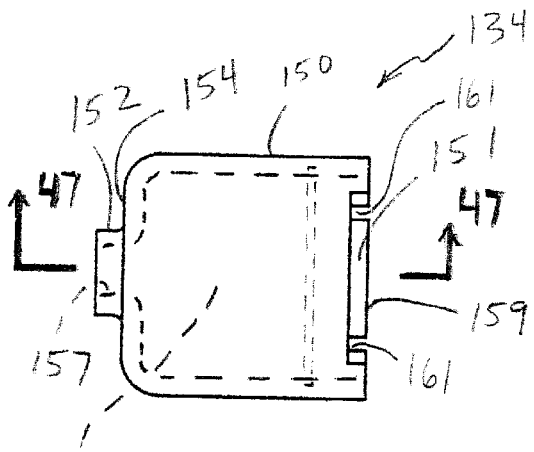
FIG. 44 is an end elevational view of a cylinder portion of the disc brake caliper assembly illustrated in FIGS. 31 and 32.
Figure 45:
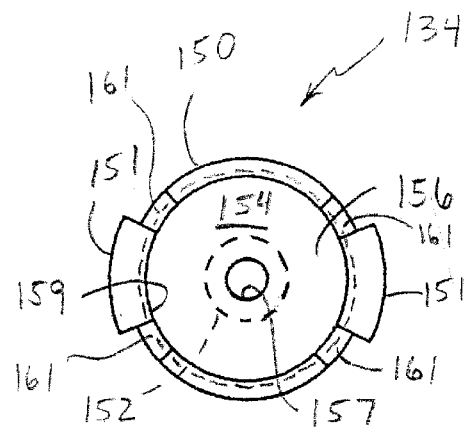
FIG. 45 is an inside elevational view of the first cylinder portion illustrated in FIG. 44.
Figure 46:
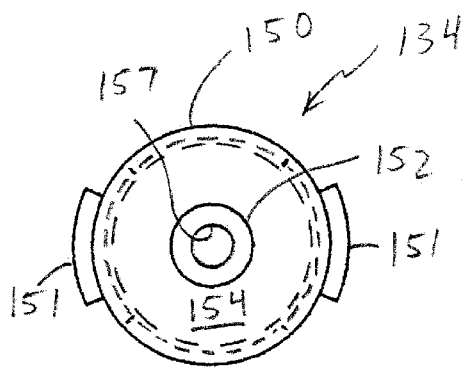
FIG. 46 is an outside elevational view of the first cylinder portion illustrated in FIGS. 44 and 45.
Figure 47:
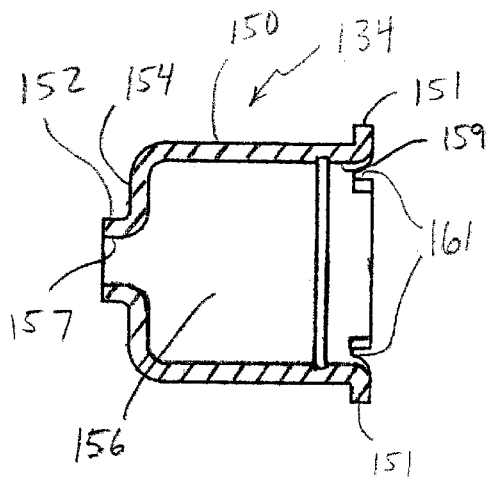
FIG. 47 is a cross-sectional view of the first cylinder portion illustrated in FIGS. 44–46, as viewed along section lines 47—47 of FIG. 44.

As best seen in FIGS. 5 and 6, the disc brake caliper assembly 20 basically includes a caliper housing 26 with a pair (first and second) of friction members 28a and 28b coupled to the caliper housing 26. In the illustrated embodiment, the (second) friction member 28b is fixedly coupled to the caliper housing 26, while the other (first) friction member 28a is movable coupled to the caliper housing 26. A rotor receiving slot is formed between friction members 28a and 28b to receive the disc brake rotor 22. The movable friction member 28a (first friction member) is moved by a piston mechanism 30 in response to movement of the brake operating mechanism 24 to apply a braking force on the disc brake rotor 22, as discussed in more detail below.

The caliper housing 26 basically includes a support portion 32 and a first cylinder portion 34 coupled to the support portion 32. The caliper housing 26 also preferably includes a mounting portion 36 for coupling with the support portion 32 and the cylinder portion 34 to the front fork 16. Preferably, the support portion 32, the cylinder portion 34 and the mounting portion 36 are each formed of one or more pieces of deformed sheet material such as press formed sheet metal. The various pieces are preferably fixedly coupled together by welding and/or brazing and/or bolted together as discussed below in more detail. In other words, each of the support portion 32, the cylinder portion 34 and the mounting portion 36 are preferably formed by one or more independent members that are subsequently fixedly coupled together to form the caliper housing 26. In any event, preferably the cylinder portion 34 is at least an independent member from the support portion 32 such that the cylinder portion 34 can be primarily formed of deformed sheet material.

The support portion 32 basically includes a first housing part 38a and a second housing part 38b fixedly coupled together. Preferably, the first and second housing parts 38a and 38b are fixedly coupled together by a pair of bolts 39a with a pair of nuts 39b threadedly coupled to the bolts 39a. The first housing part 38a is preferably constructed of a single piece of deformed sheet material such as press formed sheet metal. Likewise, the second housing part 38b is also preferably formed of a single piece of deformed sheet material such as press formed sheet metal. The cylinder portion 34 is preferably fixedly coupled to the first housing part 38a by welding or brazing to form a rigid unitary body with the first housing part 38a. Likewise, the mounting portion 36 is also preferably fixedly coupled with the first housing part 38a and the cylinder portion 34 by welding or brazing to form the rigid unitary body with the cylinder portion 34 and the first housing part 38a. Accordingly, each part of the caliper housing 26 is of deformed sheet material, except for the fastening elements (the welds, the bolts and the nuts).

Referring to FIGS. 7–11, the first housing part 38a basically includes an (first) attachment plate 40 and a pair (first and second) of side plates 42. The first housing part 38a is preferably constructed of a single piece of deformed sheet material such press formed sheet metal. The attachment plate 40 has a pair of attachment holes 41 formed therein to receive the bolts 39a. Each of the side plates 42 is preferably a substantially L-shaped plate member. More specifically, each of the side plates 43 is preferably a curved L-shaped member (or J-shaped member), and includes a cylinder support flange 43 formed at a free end thereof The cylinder support flanges 43 extend at substantially right angles relative to the side plates 42, and extend toward each other. The support flanges 43 are configured to support an end of the cylinder portion 34 of the caliper housing 26. The side plates 42 are also configured to support the mounting portion 36, as discussed below in more detail. The attachment plate 40 is preferably a substantially flat rectangular-shaped member that is designed to contact a portion of the second housing part 38b.

Referring to FIGS. 12–15, the second housing part 38b basically includes an (second) attachment plate 44 and a reinforcing flange 46. The second housing part 38b is preferably constructed of a single piece of deformed sheet material such press formed sheet metal. The attachment plate 44 has a pair of attachment holes 45 formed therein to receive the bolts 39a. When the second housing part 38b is coupled to the first housing part 38a via the bolts 39a and the nuts 39b, a portion of the (second) attachment plate 44 contacts the (first) attachment plate 40 of the first housing part 38. In other words, the attachment holes 45 are aligned with the attachment holes 41 such that bolts 39a can be mounted therein. The reinforcing flange 46 is a substantially U-shaped flange extending from one side of the attachment plate 44. The second friction member 28b is attached to the opposite side of the attachment plate 44 from the reinforcing flange 46 at a free end of the attachment plate 44.

Preferably, the second friction member 28b is fixedly coupled to the attachment plate 44 via adhesive or glue. Of course, it will be apparent to those skilled in the art that the second friction member 28b could be fixedly coupled to the second housing part 38b utilizing any suitable technique as needed and/or desired. The reinforcing flange 46 preferably extends at substantially a right angle relative to the attachment plate 44, and includes a transverse section 48 and a pair of longitudinal sections 49. The longitudinal sections 49 are tapered toward the attachment plate 44 as the longitudinal sections 49 extend away from the transverse section 48.

Preferably, the longitudinal sections 49 extend completely to the free end of the attachment plate 44 such that a lightweight, rigid member is formed.

Referring to FIGS. 16–19, the (first) cylinder portion 34 basically includes an enlarged section 50 integrally formed with a reduced diameter section 52. The cylinder portion 34 is preferably a tubular member that is constructed of a single piece of deformed sheet material such as press formed sheet metal. In other words, the cylinder portion 34 is an independent member from the support portion 32 (the first and second housing parts 38a and 38b).

The enlarged section 50 and the reduced section 52 are preferably cylindrical sections that have a circular-shaped cross section. An end plate 54 connects the enlarged section 50 with the reduced section 52 to form a one-piece unitary member. The internal surface of the end plate 54 forms an abutment surface for the piston mechanism 30, while the external surface of the end plate 54 forms an attachment surface configured to be supported by the cylinder support flanges 43 of the first housing part 38a. Preferably, the cylinder support flanges 43 are fixedly coupled to the end plate 54 of the cylinder portion 34 by welding or brazing such that the cylinder portion 34 is fixedly coupled to the first housing part 38a.

The cylinder portion 34 includes a (first) piston chamber 56 with a (first) fluid inlet opening 57 fluidly coupled to the piston chamber 56 and a (first) piston receiving opening 59. The piston mechanism 30 is at least partially received in the piston chamber 56. The enlarged section 50 of the cylinder portion 34 includes an annular groove 51 designed to engage a portion of the piston mechanism 30, as discussed below in more detail. Preferably, the open end of the reduced diameter section 52 forms the fluid inlet opening 57 of the cylinder portion 34. The fluid inlet opening 57 is designed to be directly fixedly coupled to a fluid supply hose 60, as also discussed in more detail below.

Referring to FIGS. 19–22, the mounting portion 36 is preferably a plate-shaped strap member constructed of a single piece of deformed sheet material such as press formed sheet metal. The mounting portion 36 basically includes a curved cylinder support section 62 with a pair of mounting sections 64 extending from opposite ends of the curved cylinder support section 62. Each of the mounting sections 64 includes a mounting hole 65. The mounting sections 64 are utilized to fixedly couple the disc brake caliper assembly 20 to the front fork 16 of the bicycle in a relatively conventional manner.

The mounting portion 36 is preferably fixedly coupled to both the cylinder portion 34 and the first housing part 38a by welding or brazing. More specifically, the curved cylinder support section 62 is preferably coupled to the external surface of the enlarged section 50 of the cylinder portion 34. Also, the curved cylinder support section 62 is preferably coupled to the inner edges of the side plates 42 of the first housing part 38a. In other words, the mounting portion 36 is preferably fixedly coupled to and arranged between the cylinder portion 34 and the first housing part 38a. Preferably, these members are coupled together by welding or brazing.

As discussed above, preferably the mounting portion 36 is formed as a one-piece unitary member that is separate from the cylinder portion 34 and the support portion 32 (first housing part 38a and second housing part 38b). However, it will be apparent to those skilled in the art that mounting portion 36 could be integrally formed with the first housing part 38a, as discussed below in reference to another preferred embodiment of the present invention.

Referring to FIGS. 6 and 23–30, the piston mechanism 30 basically includes a (first) piston 70 movably coupled in the piston chamber 56 and a friction member support portion 72 coupled to the piston 70. The piston 70 is that can be constructed of any suitable material. For example, the piston 70 can be constructed of machined metallic material such as machined aluminum or a resin with heat resistant characteristics. The piston 70 preferably has a step-shaped configuration. The friction member support portion 72 is also preferably constructed of a machined metallic material such as machined steel. The friction member support portion 72 is releasably coupled to the piston 72 to move with the piston 70 during actuation. The piston 70 is normally biased toward a release position from a braking position. The piston 70 is moved from the release position to the braking position via fluid pressure supplied by the brake operating mechanism 24 in a conventional manner.

The piston 70 basically includes a seal portion 74 (first enlarged end) with a central protrusion 76 (second reduced end) extending axially therefrom. The seal portion 74 has a plurality of arc-shaped projections 75 extending axially from the opposite side from the central protrusion 76. The projections 75 contact the internal contact surface of the end plate 54 of the cylinder portion 34 when the piston 70 is in the release position. The projections 75 aid in the transmission of hydraulic pressure. While the projections 75 are illustrated as arc-shaped, it will be apparent to those skilled in the art that other shapes could be utilized if needed and/or desired. An annular groove 78 is formed in the external surface of the seal portion 74. An O-ring 79 is mounted in the groove 78 to form a fluid tight seal. A biasing member (e.g., a cone spring or a coil spring or Belleville washers) 80 is mounted on the central protrusion 76 of the piston 70. One end of the biasing member 80 is arranged to contact the seal portion 74 of the piston 70, while the other end of the biasing member 80 is arranged to contact an annular abutment ring 82.

The annular ring 82 is preferably a snap ring that is mounted in the annular groove 51 formed in the enlarged section 50 of the cylinder portion 34 to retain the piston 70 within the piston chamber 56. The friction member support portion 72 is also preferably a step shaped member. More specifically, the friction member support portion 72 includes a central stump 84 extending from a base portion 86. The central stump 84 includes an annular groove 85 with an O-ring received therein. The central protrusion 76 of the piston 70 includes a stepped bore 88 that is sized and configured to retain the central stump 84 with the O-ring therein. Thus, the friction member support portion 72 is releasable coupled to the piston 70. When the piston 70 is in the release position, the base portion 86 contacts an opposite end of the annular ring 82.

In the illustrated embodiment, the friction member support portion 72 has the first friction member 28a fixedly coupled thereto via adhesive or glue. Of course, it will be apparent to those skilled in the art that the first friction member 28a could be coupled to the friction member support portion in any conventional manner if needed and/or desired. Moreover, it will be apparent to those skilled in the art that the first friction member 28a could be integrally formed with friction member support portion 72 if needed and/or desired. Furthermore, it will be apparent to those skilled in the art from this disclosure that the piston 70 and/or the friction member support portion 72 could be constructed of other materials as needed and/or desired. For example, the piston 70 and/or the friction member support portion 72 could be constructed of a heat resistant material such as resin, molded plastic or the like, if needed and/or desired.

Referring again to FIG. 3, the fluid supply hose 60 is fixedly coupled to the reduced diameter section 52 of the cylinder portion 34 by brazing or welding. Specifically, the fluid supply hose 60 is preferably constructed of rigid metallic material with one end of the fluid supply hose received in the fluid inlet opening 57 of the cylinder portion 34, and welded or brazed thereto. The opposite end of the fluid supply hose 60 is preferably fixedly coupled to a metal connection member 61 by welding or brazing. The connection member 61 is fluidly coupled to the brake operating mechanism 24 in a conventional manner such that actuating fluid is supplied to the disc brake caliper assembly 20.

Referring again to FIG. 1, the brake operating mechanism 24 will now be described in more detail. Basically, the brake operating mechanism 24 is designed to actuate the disc brake caliper assembly 20 to apply a forcible gripping action on the brake disc 22 to stop rotation of the front wheel 18. The brake operating mechanism 24 basically includes a brake lever 90, a hydraulic or master cylinder 91, a hydraulic or master piston 92, and an actuation fluid reservoir 93.

Preferably, the brake operating mechanism 24 is a single unit, which is mounted on the handlebar 14. In particular, the brake lever 90 includes a mounting portion 94 and a lever portion 95. The mounting portion 94 is designed to be clamped onto the handle bar 14 in a conventional manner. The mounting portion 94 is integrally formed with the master cylinder 91 such that the master cylinder 91, the master piston 92 and the actuation fluid reservoir 93 are all supported on the mounting portion 94 of the brake lever 90. The lever portion 95 is pivotally coupled to the mounting portion 94 for movement between a release position and a braking position. Normally, the lever portion 94 is maintained in the release position in a conventional manner.

The master piston 92 is movably mounted within the master cylinder 91 in a conventional manner. More specifically, the actuation fluid reservoir 93 is mounted on the master cylinder 92 and in fluid communication with the interior bore of the master cylinder 91 for supplying the actuation fluid thereto. The master piston 92 is connected at one end to the lever portion 95 for axially moving the master piston 92 within the master cylinder 91. Accordingly, actuation of the lever portion 95 causes the master piston 92 to move axially within the master cylinder 91. This movement of the master piston 92 within the master cylinder 91 directs fluid pressure through a hydraulic line 96, which is coupled to the disc brake caliper assembly 20. Thus, the pressurized actuation fluid causes the piston 70 and the friction member 28a to move so as to engage the disc brake rotor 22 between the friction members 28a and 28b to stop rotation of wheel 18.

Second Embodiment

Referring to FIGS. 31–47, a disc brake caliper assembly 120 is illustrated in accordance with a second embodiment of the present invention. Disc brake caliper assembly 120 of this second embodiment is substantially identical to the disc brake caliper assembly 20 of the first embodiment, except that a modified caliper housing 126 is utilized. Thus, this second embodiment will not be discussed or illustrated in detail herein. Rather, the following description will focus mainly on the differences. However, it will be apparent to those skilled in the art that most of the descriptions of the disc brake caliper assembly 20 of the first embodiment also apply to the disc brake caliper assembly 120 of this second embodiment.

The disc brake caliper assembly 120 is designed to be used with the brake operating mechanism 24 of the first embodiment, and basically includes the caliper housing 126, a pair (first and second) of friction members 128a and 128b, and a piston mechanism 130. The friction members 128a and 128b are identical to the friction members 28a and 28b of the first embodiment. Additionally, the piston mechanism 130 is identical to the piston mechanism 30 of the first embodiment. On the other hand, the caliper housing 126 is a modified version of the caliper housing 26 of the first embodiment.

Specifically, the caliper housing 126 includes a support portion 132, a cylinder portion 134 and a mounting portion 136. The support portion 132 includes a first housing part 138a, a spacer 138b and a second housing part 138c. The first and second housing parts 138a and 138c are fixedly coupled together by a pair of bolts 139 with the spacer 138b located therebetween. The mounting portion 136 basically includes first and second mounting sections 162, which are integrally formed with the first housing part 138a. The first housing part 138a includes an attachment plate 140 with a pair of attachment holes 141 and a pair of side plates 142a and 142b. The mounting sections 162 extend from the side plates 142a and 142b. A cylinder support opening 143 is formed in the attachment plate 140. In other words, the first housing part 138a is integrally formed with the mounting sections 162 to form the mounting portion 136 of the caliper housing 126.

The second housing part 138c includes an attachment plate 144 with a pair of threaded bores 145 formed therein. The second friction member 128b is fixedly coupled to the attachment plate 144. Two reinforcing flanges 146 extend in a generally longitudinal direction relative to attachment plate 144 and are substantially perpendicular to the attachment plate 144. The threaded holes 145 of the attachment plate 144 eliminate the need for the nuts 39b (of the first embodiment). The spacer 138b includes a pair of mounting holes formed therein for receiving the bolts 139.

The cylinder portion 134 is a modified version of the cylinder portion 34 of the first embodiment. Specifically, the cylinder portion 134 includes and enlarged section 150, a reduced diameter section 152 and an end plate 154. A piston chamber 156 is formed within the cylinder portion 134 and includes a fluid inlet opening 157 fluidly coupled to the piston chamber 156 and a piston receiving opening 159 arranged at an opposite end of the piston chamber 156 from the fluid inlet opening 157. A pair of flanges 151 are formed adjacent the piston receiving opening 159 and extend substantially perpendicularly from the enlarged section 150. Two cutouts or notches 161 are formed on opposite sides of the flanges 151. The flanges contact the attachment plate 144.

Preferably, the caliper housing assembly 120 of this second embodiment is constructed and assembled in a manner identical to the first embodiment, except that the specific structure of some of the parts have been modified. In other words, the cylinder portion 134 is preferably constructed of a single piece of deformed sheet material such as press formed sheet metal. Also, the first housing part 138a is preferably constructed of a single piece of deformed sheet material such as press formed sheet metal. The first cylinder portion 134 is preferably fixedly coupled to the first housing part 138a by welding or brazing. The second housing part 138b is also preferably constructed of a single piece of deformed sheet material such as press formed sheet metal.

Third Embodiment

Figure 48:
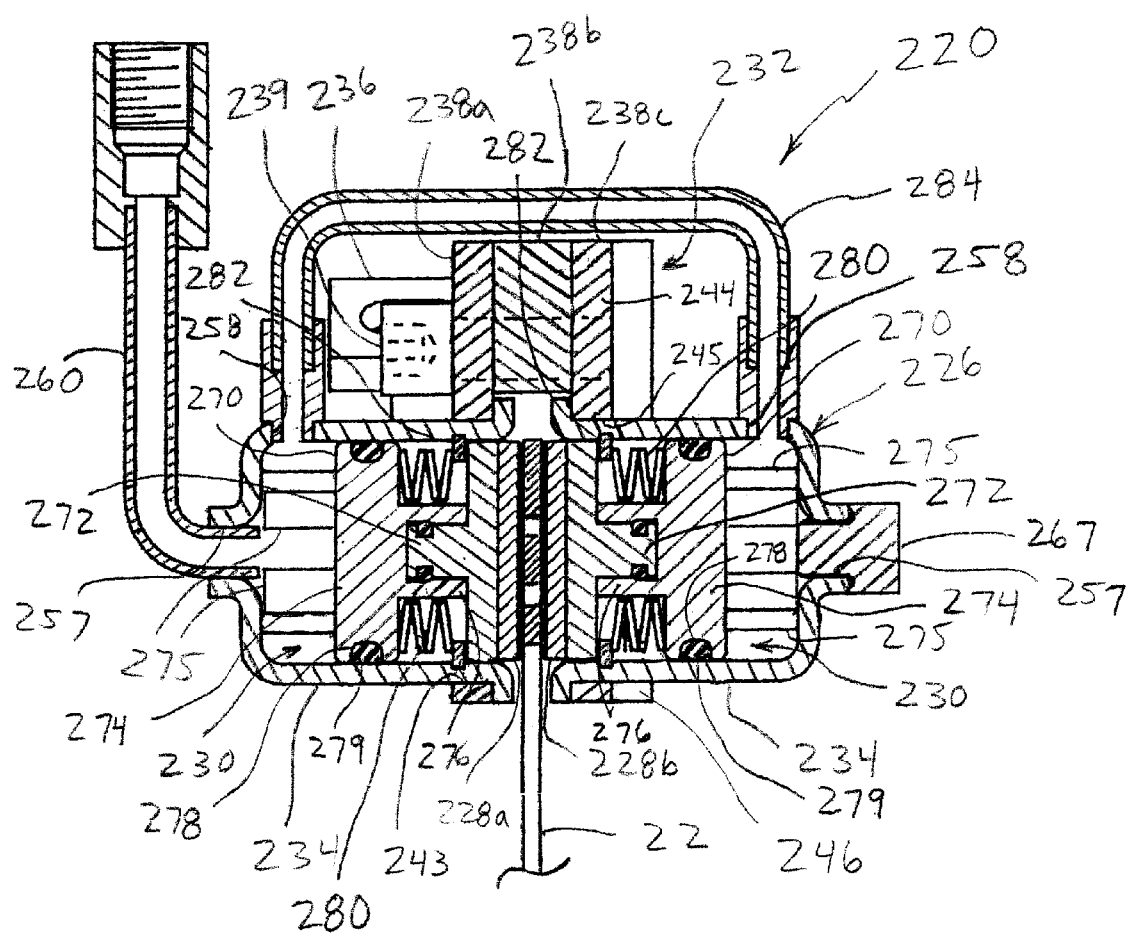
FIG. 48 is a partial, cross-sectional view of a disc brake caliper assembly in accordance with a third embodiment of the present invention.

Referring now to FIG. 48, a disc brake caliper assembly 220 is illustrated in accordance with a third embodiment of the present invention. The disc brake caliper assembly 220 of this third embodiment is substantially identical to the disc brake caliper assembly 120 of the second embodiment, except that the disc brake caliper assembly 220 is designed to utilize a pair of modified piston mechanisms 230. Since the disc brake caliper assembly 220 is substantially identical to the disc brake caliper assembly 120, the disc brake caliper assembly 220 will not be discussed and/or illustrated in detail herein. Rather, the following description will focus mainly on the differences of the disc brake caliper assembly 220 from the prior embodiments. However, it will be apparent to those skilled in the art from this disclosure that most of the descriptions of the disc brake caliper assemblies 20 and 120 also apply to the disc brake caliper assembly 220.

The disc brake caliper assembly 220 is designed to be used with the brake operating mechanism 24 of the first embodiment, and basically includes a caliper housing 226, a pair (first and second) of friction members 128a and 128b, and a pair of piston mechanisms 230. The friction members 228a and 228b are identical to the friction members of the first embodiment. Additionally, each of the piston mechanisms 230 is substantially identical to the piston mechanism 130 of the second embodiment.

Specifically, the caliper housing 226 includes a support portion 232, a pair (first and second) of cylinder portions 234 and a mounting portion 236. The support portion 232 includes a first housing part 238a, a spacer 238b and a second housing part 238c. The first and second housing parts 238a and 238c are fixedly coupled together by a pair of bolts 239 with the spacer 238b located therebetween. The mounting portion 236 is basically identically to the mounting portion 136, and thus, is integrally formed with the first housing part 238a. The first housing part 238a is basically identically to the first housing part 138, and thus, has a cylinder support opening 243 for supporting one of the cylinder portions 234.

The second housing part 238c is basically identical to the second housing part 138c of the second embodiment, except that the attachment plate 244 has a cylinder support opening 245 for supporting one of the cylinder portions 234 and the two reinforcing flanges 246 (only one shown) are longer.

Each of the piston mechanisms 230 basically includes a piston 270 movably coupled in the piston chamber 256 of the corresponding cylinder portion 234 and a friction member support portion 272 coupled to the piston 270. The pistons 270 are moved from the release positions to the braking positions via fluid pressure supplied by the brake operating mechanism 24 in a conventional manner.

Each of the pistons 270 basically includes a seal portion 274 (first enlarged end) with a central protrusion 276 (second reduced end) extending axially therefrom. The seal portion 274 has a plurality of arc-shaped projections 275 extending axially from the opposite side from the central protrusion 276. The projections 275 contact the internal contact surface of the cylinder portion 234 when the piston 270 is in the release position. The projections 275 aid in the transmission of hydraulic pressure. The projections 275 are preferably arc-shaped as in the prior embodiments, but longer in the axial direction. An annular groove 278 is formed in the external surface of the seal portion 274. An O-ring 279 is mounted in the groove 278 to form a fluid tight seal. A biasing member (e.g., Belleville washers) 280 is mounted on the central protrusion 276 of each of the pistons 270. The first and second pistons 270 are normally biased toward their release positions by the first and second biasing members 280, respectively. Each biasing member 280 in this embodiment is shorter in the axial direction than in the prior embodiments, since there are two piston mechanisms 230 with one biasing member 280 for each piston 270. One end of the biasing member 280 is arranged to contact the seal portion 274 of the piston 270, while the other end of the biasing member 280 is arranged to contact an annular abutment ring 282. In the illustrated embodiment, the friction member support portions 272 have the friction members 228a and 228b fixedly coupled thereto via adhesive or glue.

The cylinder portions 234 are identical and fluidly connected by a conduit or fluid connection hose 284. The cylinder portions 234 are fixedly coupled to one of the housing parts 238a and 238c. Each of the cylinder portions 234 forms a piston chamber with a pair of inlet/outlet ports or fluid inlet/outlet openings 257 and 258. Thus, the cylinder portions 234 are identical to the cylinder portion 134, except that inlet/outlet ports 258 are provided to receive fittings of the fluid connection hose 284.

The piston chambers of the cylinder portions 234 are interconnected by the fluid connection hose 284 so that both pistons 270 move simultaneously. More specifically, one of the cylinder portions 234 has the port 257 (first fluid inlet opening) fixedly coupled to the fluid supply hose 260 and the port 258 (first fluid outlet opening) in fluid communication with the port 258 (second fluid inlet opening) of the other cylinder portion 234 via the fluid connection hose 284. The other cylinder portion 234 has a sealing cap 267 mounted in the port 257 (access opening).

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A disc brake caliper assembly comprising:
   a caliper housing including a first housing part formed of deformed sheet material, a second housing part formed of deformed sheet material detachably coupled to said first housing part, and a first cylinder portion coupled to said first housing part, said first cylinder portion having a first piston chamber with a first fluid inlet opening fluidly coupled to said first piston chamber and a first piston receiving opening, said first cylinder portion being an independent component from said first housing part;
   a mounting portion formed of deformed sheet material having a pair of mounting sections non-movably fixed to said first housing part and said first cylindrical portion such that said mounting portion, said first housing part, and said first cylindrical portion are separable as a unit from said second housing part;
   first and second friction members coupled to said caliper housing to form a rotor receiving slot therebetween, at least said first friction member being movably coupled to said first housing part; and
   a first piston movably coupled in said first piston chamber of said first cylindrical portion to move said first friction member between a release position and a braking position.

2. The disc brake caliper assembly according to claim 1, wherein said first cylinder portion is constructed of deformed sheet material.

3. The disc brake caliper assembly according to claim 2, wherein said first cylinder portion is constructed of press formed sheet metal.

4. The disc brake caliper assembly according to claim 1, wherein
   said first cylinder portion is fixedly coupled to said first housing part by welding or brazing.

5. The disc brake caliper assembly according to claim 1, wherein
   said mounting portion is a strap member that is a separate member from said first housing part and said first cylinder portion.

6. The disc brake caliper assembly according to claim 5, wherein
said first cylinder portion, said first housing part and said strap member are constructed of press formed sheet metal and are fixedly coupled together by welding or brazing.

7. The disc brake caliper assembly according to claim 1, wherein
said mounting sections are integrally formed with said first housing part.

8. The disc brake caliper assembly according to claim 1, wherein
said first and second housing parts are fixedly coupled together with a spacer coupled between said first and second housing parts.

9. The disc brake caliper assembly according to claim 1, wherein
said second friction member is fixedly coupled to said second housing part.

10. The disc brake caliper assembly according to claim 1, wherein
said first and second housing parts are constructed of press formed sheet metal.

11. The disc brake caliper assembly according to claim 1, wherein
said second friction member is movably coupled to said second housing part to move said second friction member between a release position and a braking position.

12. The disc brake caliper assembly according to claim 11, wherein
said caliper housing includes a second cylinder portion fixedly coupled to said second housing part, said second cylinder portion having a second piston chamber a second fluid inlet opening fluidly coupled to said second piston chamber and a second piston receiving opening with a second piston movably coupled therein to move said second friction member between said release position and said braking position.

13. The disc brake caliper assembly according to claim 12, wherein
said first fluid inlet opening of said first cylinder portion is fixedly coupled to a fluid supply hose.

14. The disc brake caliper assembly according to claim 13, wherein
said first cylinder portion includes a first fluid outlet opening in fluid communication with said first piston chamber and said second fluid inlet opening of said second cylinder portion.

15. The disc brake caliper assembly according to claim 14, wherein
said first fluid outlet opening of said first cylinder portion and said second fluid inlet opening of said second cylinder portion are fixedly coupled to opposite ends of a fluid connection hose.

16. The disc brake caliper assembly according to claim 15, wherein
said second cylinder portion includes an access opening formed at a free end thereof with a sealing cap mounted in said access opening.

17. The disc brake caliper assembly according to claim 16, wherein
said second cylinder portion is identical to said first cylinder portion.

18. The disc brake caliper assembly according to claim 12, wherein
said first and second pistons are normally biased toward said release positions by first and second biasing members, respectively.

19. The disc brake caliper assembly according to claim 18, wherein
said first and second biasing members are cone springs.

20. The disc brake caliper assembly according to claim 1, wherein
said first fluid inlet opening of said first cylinder portion is fixedly coupled to a fluid supply hose.

21. The disc brake caliper assembly according to claim 20, wherein
said first cylinder portion and said fluid supply hose are constructed metal and are fixedly coupled together by welding or brazing.

22. The disc brake caliper assembly according to claim 1, wherein
said first piston is normally biased toward said release position by a first biasing member.

23. The disc brake caliper assembly according to claim 22, wherein
said first biasing member is a cone spring.

24. The disc brake caliper assembly according to claim 22, wherein
said first cylinder portion includes an abutment ring coupled therein to engage one end of said biasing member and the first piston includes a contact surface arranged to engage the other end of said biasing member.

25. The disc brake caliper assembly according to claim 1, wherein
first housing part includes an attachment plate and a first side plate extending from said attachment plate to support said first cylinder portion.

26. The disc brake caliper assembly according to claim 25, wherein
said first housing part includes a second side plate extending from said attachment plate to form a substantially U-shaped member.

27. The disc brake caliper assembly according to claim 26, wherein
each of said first and second side plates includes a cylinder support flange arranged to contact an end plate of said first cylinder portion.

28. The disc brake caliper assembly according to claim 26, wherein
each of said first and second side plates is a substantially L-shaped member.

29. The disc brake caliper assembly according to claim 25, wherein
said second housing part is coupled to said attachment plate of said first housing part.

30. A disc brake caliper assembly comprising:
a caliper housing including a first housing part, a first cylinder portion fixedly coupled to said first housing part, a second housing part coupled to said first housing part, and a mounting portion fixedly coupled with said first housing part and said first cylinder portion, said first cylinder portion having a first piston chamber with a first fluid inlet opening fluidly coupled to said first piston chamber and a first piston receiving opening, said first cylinder portion being an independent component from said first housing part, said mounting portion being a strap member with a pair of mounting sections;

first and second friction members coupled to said caliper housing to form a rotor receiving slot therebetween, at least said first friction member being movably coupled to said caliper housing and said second housing part supporting said second friction member; and a first piston movably coupled in said first piston chamber of said caliper housing to move said first friction member between a release position and a braking position.

31. The disc brake caliper assembly according to claim 30, wherein said first and second housing parts are formed of deformed sheet material.

32. The disc brake caliper assembly according to claim 31, wherein said first cylinder portion is constructed of deformed sheet material.

33. A disc brake caliper assembly comprising:

a caliper housing including a support portion and a first cylinder portion coupled to said support portion, said first cylinder portion having a first piston chamber with a first fluid inlet opening fluidly coupled to said first piston chamber and a first piston receiving opening, said first cylinder portion being an independent component from said support portion;

first and second friction members coupled to said caliper housing to form a rotor receiving slot therebetween, at least said first friction member being movably coupled to said caliper housing; and a first piston movably coupled in said first piston chamber of said caliper housing to move said first friction member between a release position and a braking position, said first piston being normally biased toward said release position by a first biasing member, said first cylinder portion further including an abutment ring coupled therein to engage one end of said biasing member, and said first piston including a contact surface arranged to engage the other end of said biasing member, said first piston being a step shaped member with a first enlarged end arranged adjacent said first fluid inlet opening to form said contact surface and a second reduced end arranged adjacent said first friction member.

34. The disc brake caliper assembly according to claim 33, wherein said enlarged end includes an annular external groove with an O-ring received therein to form a fluid tight seal with an interior wall of said first cylinder portion.

35. The disc brake caliper assembly according to claim 33, wherein said enlarged end includes a plurality of protrusions extending axially therefrom to form a free end of said first piston.

36. The disc brake caliper assembly according to claim 35, wherein each of said protrusions is arc-shaped.

37. The disc brake caliper assembly according to claim 33, wherein said first friction member is coupled to said reduced end and arranged to contact said abutment ring when said first piston is in said release position.

38. The disc brake caliper assembly according to claim 37, wherein said reduced end has an opening formed in a free end thereof and said first friction member includes a projection coupled within said opening.

* * * * *